United States Patent
Akagami et al.

(10) Patent No.: US 6,857,940 B2
(45) Date of Patent: Feb. 22, 2005

(54) POLISHING APPARATUS AND METHOD

(75) Inventors: Yoichi Akagami, Akita (JP); Yukichi Satou, Honjyo (JP); Chikayoshi Yamamoto, Ohta-ku (JP)

(73) Assignee: Governor of Akita prefecture, Akita (JP)

( * ) Notice: Subject to any disclaimer, the term of this patent is extended or adjusted under 35 U.S.C. 154(b) by 108 days.

(21) Appl. No.: 10/054,937

(22) Filed: Jan. 25, 2002

(65) Prior Publication Data

US 2003/0068964 A1 Apr. 10, 2003

(30) Foreign Application Priority Data

Oct. 5, 2001 (JP) .......................................... 2001-309902

(51) Int. Cl.⁷ ................................................. B24B 1/00
(52) U.S. Cl. ........................... 451/36; 451/60; 451/160; 451/285; 451/314; 438/692; 156/345.12
(58) Field of Search .......................... 451/160, 41, 285, 451/287, 290, 63, 36, 60, 5, 6, 272, 273, 274, 314, 283; 156/345.12; 438/691, 692

(56) References Cited

U.S. PATENT DOCUMENTS

| | | | | |
|---|---|---|---|---|
| 5,575,706 A | * | 11/1996 | Tsai et al. .................... 438/693 |
| 5,624,300 A | * | 4/1997 | Kishii et al. ................... 451/36 |
| 5,685,766 A | * | 11/1997 | Mattingly et al. ............. 451/36 |
| 6,010,964 A | * | 1/2000 | Glass .......................... 438/692 |
| 6,066,030 A | * | 5/2000 | Uzoh ........................... 451/41 |
| 6,113,464 A | * | 9/2000 | Ohmori et al. ................ 451/41 |
| 6,190,494 B1 | * | 2/2001 | Dow .......................... 438/692 |
| 6,217,423 B1 | * | 4/2001 | Ohmori et al. ................ 451/63 |
| 6,368,190 B1 | * | 4/2002 | Easter et al. ................. 451/41 |
| 6,537,139 B2 | * | 3/2003 | Ohmori ....................... 451/56 |
| 6,576,552 B2 | * | 6/2003 | Kojima et al. .............. 438/691 |
| 6,620,336 B2 | * | 9/2003 | Nakamura ..................... 451/5 |

* cited by examiner

Primary Examiner—Hadi Shakeri
(74) Attorney, Agent, or Firm—Oblon, Spivak, McClelland, Maier & Neustadt, P.C.

(57) ABSTRACT

A polishing method with a polishing apparatus includes an electrode constituted as a plurality of electrode elements, a device of driving the electrode, and dielectric abrasive particles disposed between the electrode and a workpiece. Polishing pressure is applied to the particles by a Coulomb force generated when an alternating-current voltage is applied to the electrode.

4 Claims, 7 Drawing Sheets

POLISHING APPARATUS AND METHOD

BACKGROUND OF THE INVENTION

1. Field of the Invention

The present invention relates to a polishing apparatus in which polishing of a workpiece is effected using dielectric abrasive particles located at a position at which processing pressure is applied by a Coulomb force produced when a voltage is applied across electrodes.

2. Description of the Prior Art

Polishing apparatuses having various configurations have been proposed. A polishing apparatus generally has a polishing pad holding abrasive particles that is affixed to a surface plate, and effects polishing by moving one of the plate and the workpiece with respect to the other. In recent years, progress has been made with research into functional fluids that respond to an electrical field or a magnetic field, and there are polishing apparatuses that utilize such functional fluids.

In processing such as polishing and surface finishing, for example, use has been made of magnetic fluids, which are fluids containing a dispersion of angstrom-order magnetic particles. When used on their own, such a fluid has almost no polishing effect, so abrasive particles are added to the fluid for polishing applications. The magnetism induced in the magnetic fluid by a magnetic field causes the abrasive particles to be pressed against the workpiece surface by the fluid. Although polishing using a magnetic fluid is suitable when the workpiece to be polished has a spherical or other such special shape, magnetic fluid polishing has a number of problems. For example, magnetic fluid induction produces a small processing pressure that results in a low polishing efficiency. In addition, a magnetic substance prevents the polishing process to suppress the effect of enhancing surface roughness. Other problems include scratching caused by fragments of removed material that become entrained in the magnetic fluid, and the fact that in the case of a magnetic workpiece, movement of the abrasive particles is constrained, making it impossible to achieve the required polishing effect. Such problems have limited the application of polishing using magnetic fluids.

Magnetically responsive (MR) fluids are fluids containing a dispersion of iron powder or other such ferromagnetic particles having micrometer-order sizes. When a magnetic field is applied to such a fluid that also contains abrasive particles, it sets up a strong interparticle attraction that causes the ferroparticles to rapidly aggregate into thick magnetic column formations that can be used to apply a powerful processing force to the workpiece surface, ensuring a high processing efficiency. However, because it has been considered difficult to control the shape, position and apparent viscosity of the formations, it is thought that there is a high risk that applying pressure to the formations will produce scratching of the workpiece surface. Thus, it has been considered that these MR fluids are usable for primary rough grinding but are not readily usable for fine and finish polishing. The large size of the iron particles generally used in the MR fluids has posed another obstacle to their use for fine and finish polishing.

FIG. 12 shows an example of a prior art polishing apparatus. This apparatus includes a rotary electrode 1 and a polishing pad 2 directly under the rotary electrode 1. The abrasive comprises abrasive particles dispersed in silicon oil or a lubricant having electrically insulating properties. Applying an alternating-current voltage between a conductive specimen 3 and the rotary electrode 1 causes the abrasive particles to be alternatively attracted to, and repelled by, the electrode. The electrode 1 is supported so that it can be rotated in the direction indicated by arrow A by a drive means (not shown).

FIG. 13 illustrates the effect of the prior art electrode. The application of an electrical field causes the abrasive particles 4 to cluster together into chain formations having a perpendicular alignment with respect to the conductive specimen 3. In this case, there is a mutual repulsion between adjacent clusters, and in order to maintain a certain spacing, the positioning of the abrasive particles can readily become uneven, giving rise to non-uniformity in the surface roughness of the polished surface.

With the polishing apparatus of the prior art thus configured, the movement of the abrasive particles from the rotary electrode 1 onto the conductive specimen 3, and the uneven positioning of the abrasive particles, makes it difficult to achieve a high-quality polished surface in the case of large products. Moreover, having to apply a voltage between the rotary electrode and a conductive workpiece makes it difficult to apply the apparatus to insulating materials. That is, the thickness of a workpiece having insulation properties has the same effect as an air-gap, so a high polishing effect cannot be obtained without using an electrical field strength that is high enough to control the position of the abrasive particles, which means the work is dangerous and there is a risk of the workpiece being damaged by an electrical discharge.

Also, centrifugal force generated by the rotation of the polishing part tends to cause the abrasive particles to accumulate around the periphery of the polishing area, reducing polishing efficiency. In response, prior art polishing apparatuses have sought to achieve a uniform distribution of abrasive particles with respect to the workpiece by again utilizing Coulomb force to return the abrasive particles to the polishing area, using the fact that the particles to which an electrical field has been applied have a high dielectric constant. However, the aforementioned spacing between adjacent clusters of abrasive particles has made it impossible to achieve a highly uniform arrangement of the particles.

An object of the present invention is therefore to provide a polishing apparatus that can polish insulative materials and can readily control the uniformity of the abrasive particle arrangement.

SUMMARY OF THE INVENTION

To attain the above object, the present invention provides a polishing apparatus, comprising an electrode comprised of a plurality of electrode elements, a driving means for driving the electrode, and abrasive particles having a dielectric property disposed between the electrode and a workpiece at a position at which processing pressure is applied by a Coulomb force produced by application of an alternating-current voltage to the electrode. That is to say, the present invention relates to an apparatus that utilizes a Coulomb force to collect on a sample abrasive particles while dispersing the abrasive particles onto the sample and applies a processing pressure to the collected abrasive particles, thereby performing the polishing process.

The electrode can be configured as a plurality of electrode elements having different diameters that are disposed in a concentric circular formation and mutually separated by insulative material.

The electrode can be configured so that different voltages are applied to the plurality of electrode elements. For example, the voltage applied to the electrode elements gradually increases going outwards from the center elements.

The electrode can be a cylindrical electrode comprised of a film-shaped conductor and an insulative layer that are wound around a spindle so that the conductor and insulative layer are alternated around the spindle.

The apparatus can include electrode provision around an insulative tube used to supply a fluid containing a dispersion of abrasive particles to the workpiece, and application of a low-frequency alternating-current electrical field having a frequency of 0.1 to 10 Hz and an electrical field strength of 1.5 to 3 kV/mm.

Constituting the electrode as a plurality of electrode elements having different diameters that are arranged in a concentric circular formation and mutually separated by an insulative material enables uniform polishing, unaffected by the workpiece material or thickness. Also, by applying different voltages to the plurality of electrode elements and adjusting the thickness of the insulative material, it is possible to reduce scattering of abrasive particles by the centrifugal force generated by the rotation of the electrode. Moreover, applying a voltage that increases going outward from the center elements helps to provide uniform polishing. It is easy to manufacture the electrode comprised of a film-shaped conductor and an insulative layer that are wound around a spindle so that the conductor and insulative layer are alternated around the spindle, and reducing the thickness of the insulative material makes it possible to use a lower applied voltage, thus providing an energy-saving effect.

Further features of the invention, its nature and various advantages will be more apparent from the accompanying drawings and following detailed description of the invention.

DESCRIPTION OF THE PREFERRED EMBODIMENT

Figure 1:
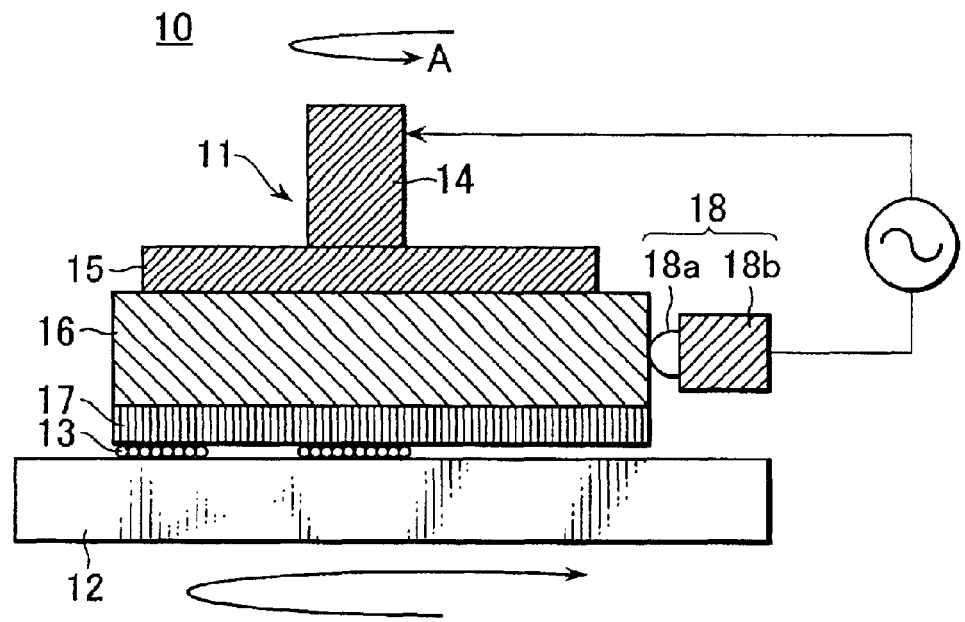
FIG. 1 is a diagram of a rotary electrode according to a first embodiment of the polishing apparatus of the present invention.
Figure 2:
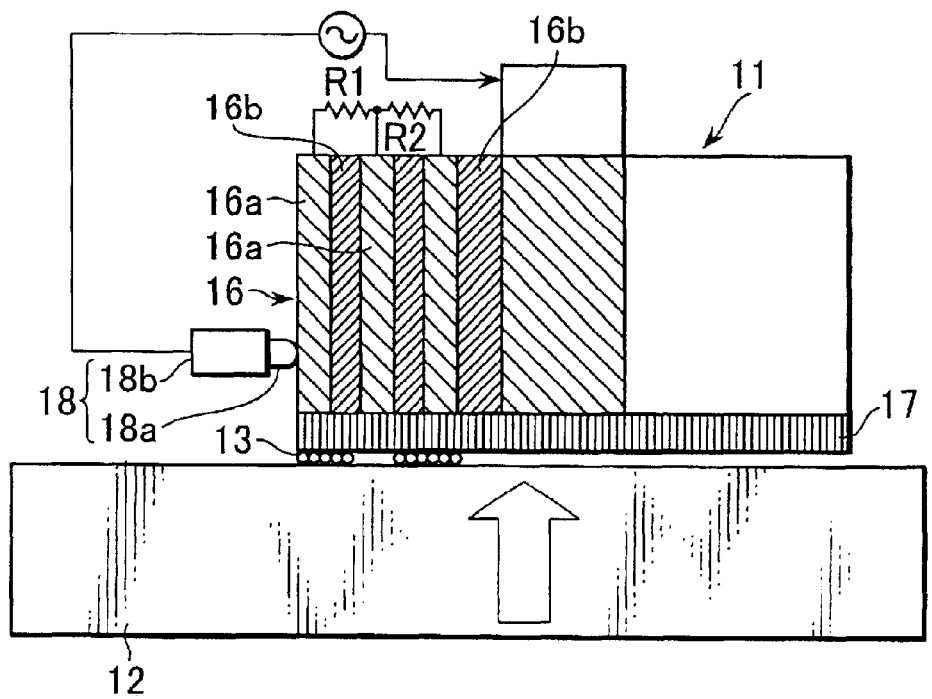
FIG. 2 is a vertical sectional view of the principle parts of the electrode of FIG. 1.
Figure 3:
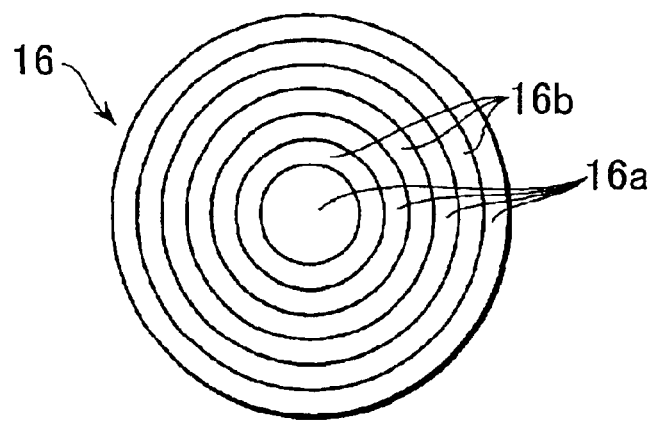
FIG. 3 is a bottom view of the electrode of FIG. 1.

The invention is described below with reference to the drawings. FIG. 1 shows a rotary electrode 11 of a polishing apparatus 10 according to a first embodiment of the invention, FIG. 2 shows a vertical cross-section of the main parts of the electrode, and FIG. 3 is a bottom view of the electrode. In the polishing apparatus 10, the rotary electrode 11 is rotated by a drive device (not shown), and a fluid comprising a lubricating oil containing a dispersion of electrically insulative abrasive particles 13 is dripped between the rotary electrode 11 and a workpiece 12. Application of a processing pressure to the collected abrasive particles enables effective polishing. By applying an alternating-current voltage to the rotary electrode 11, a Coulomb force is produced that is used to align the abrasive particles 13 into pearl chain formations between a polishing pad 17 and the workpiece 12. It is desirable for the applied electrical field to have a field strength of ±1 to 10 kV/mm and a frequency of 0.1 to 1000 Hz. When there is a large amount of polishing involved, it is better to use a square waveform with a good rise, while in the case of a small amount of polishing work, it is better to use a sinusoidal waveform with a smooth rise that contains no noise component.

The rotary electrode 11 is comprised of a support spindle 14, a backplate 15, a column-shaped electrode section 16, a disk-shaped polishing pad 17, and so forth. The support spindle 14 is supported so that it can be rotated in the direction of arrow A in FIG. 1 by a drive means (not shown). The backplate 15 is affixed to the support spindle 14 and supports the electrode section 16. The polishing pad 17 has substantially the same diameter as the electrode section 16 and is impregnated or supplied with the abrasive particles 13 dispersed in the low-viscosity lubricating oil having an electrically insulative property. An alternating-current voltage is applied to the rotary electrode 11 via a carbon feeder 18.

The electrode section 16 comprises a plurality of concentric, cylindrical. conductive electrode elements 16$a$ (FIGS. 2 and 3), to each of which a different electrical field can be applied. For example, a high electrical field is applied to the peripheral portion where there is a strong centrifugal force at work, and lower voltages are applied going towards the center. The carbon feeder 18 comprises a carbon electrode 18$a$ and a support section 18$b$. In the electrode section 16, the conductive electrode elements 16$a$ are alternated with insulative members 16$b$.

As the fluid containing abrasive particles that impregnates or is supplied to the polishing pad 17, there can be used kerosene and silicone oil and other such electrically insulative fluids having a kinetic viscosity in the order of 1 to 10000 mm$^2$/s. Single-crystalline or polycrystalline diamond, cerium oxide ($CeO_2$), alumina ($Al_2O_3$), lanthanum oxide ($La_2O_3$), praseodymium oxide ($Pr_6O_{11}$), neodymium oxide ($Nd_2O_3$), fluorides, calcium oxide, and cubic boron nitride (CBN) can be used for the dispersion particles.

The operation and effect of the polishing apparatus using the rotary electrode, according to the above-described configuration of the invention, will now be explained. First, the polishing pad 17 is impregnated with the abrasive particles dispersed in the lubricating oil and an alternating-current voltage is applied to the electrode section 16 provided with the concentrically arranged electrode elements 16$a$. The voltages are set so that higher voltages are applied to the peripheral electrode elements 16$a$ and lower voltages to the inner elements. The rotary electrode 11 is rotated by a drive means that is not shown. To make it easier to roll the abrasive particles, the workpiece 12 is rotated in the opposite direction to the rotary electrode 11. The rotary electrode 11 and workpiece 12 could instead be rotated in the same direction at different speeds.

The rotary electrode 11 is pressed toward the workpiece 12 by the application of a constant pressure. When the workpiece 12 is thus polished, there is no need to apply a voltage between the rotary electrode 11 and the workpiece 12, so the workpiece 12 does not have to be conductive. This makes it possible to polish even ceramic or glass workpieces. For example, in 15 minutes the surface roughness of glass (BK-7) was improved from 1.5 $\mu$m Ry to 0.1 $\mu$m Ry, using a processing load of 18 kgf, an applied electrical field frequency of 0.8 Hz and an electrical field strength of 1.8 kV/mm.

Figure 4:
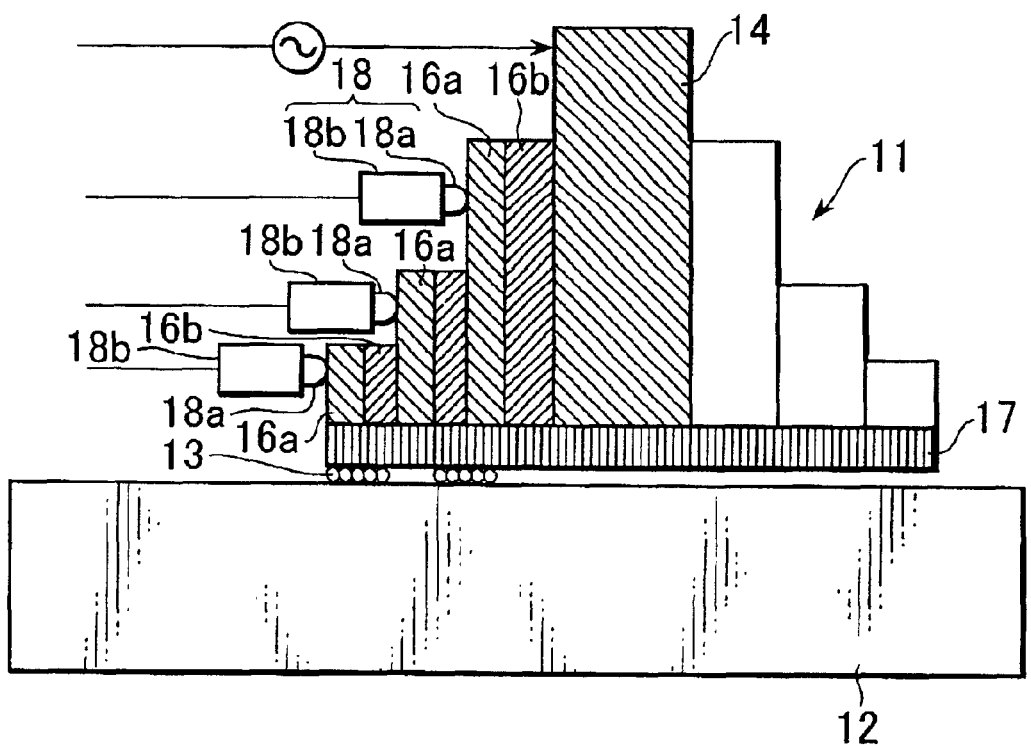
FIG. 4 is a vertical sectional view of the principle parts of a rotary electrode according to a second embodiment of the invention.

FIG. 4 is a vertical sectional view of the main parts of a rotary electrode according to a second embodiment of the invention. In this case, the electrode section 16 comprises the electrode elements 16a wound around the support spindle 14 in a stepped, spiral arrangement, with insulative members 16b interposed between the electrode elements 16a. An electric-field-applying carbon feeder 18 in contact with the outer side of each of the electrode elements 16a is used to apply a voltage. Taking the centrifugal force of the rotary electrode 11 into consideration, the abrasive particles can be uniformly positioned by adjusting the voltage applied to each electrode element, making it possible to achieve an evenly-polished surface. The abrasive particles 13 are aligned parallel to the workpiece surface as shown in FIG. 2, and there is no behavior that the abrasive particles 13 are projected from the electrode and beat and roll on the workpiece between the electrodes to enhance the polishing characteristics. As a result, it is possible to achieve high-quality polished surfaces. Also, the difference between the specific inductive capacities of the polishing debris and of the abrasive particles gives rise to a Coulomb force that makes it possible to separate and remove the debris. Since an electrical field is not applied between the rotary electrode 11 and the workpiece 12, there is no discharge damage to the workpiece 12.

The above-described configuration enables the electrical field strength to be increased at peripheral portions where there is a strong centrifugal force. The ability to apply different field voltages to each of the electrode elements 16a makes it possible to achieve a uniformly polished surface. For example, voltages of 1 kV/mm, 2 kV/mm and 3 kV/mm can be applied to the innermost, middle and outermost electrode elements 16a, respectively.

Figure 5:
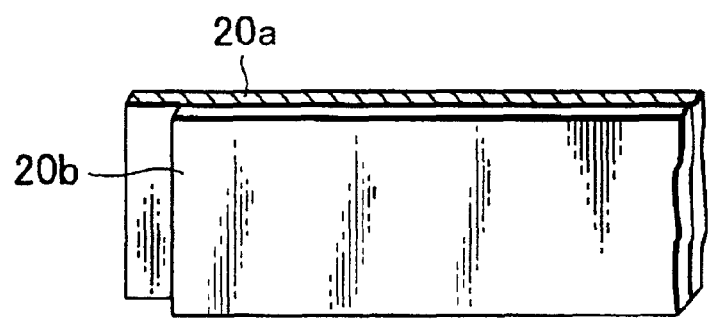
FIG. 5 shows a layer structure used to form a rotary electrode according to a third embodiment of the invention.
Figure 6:
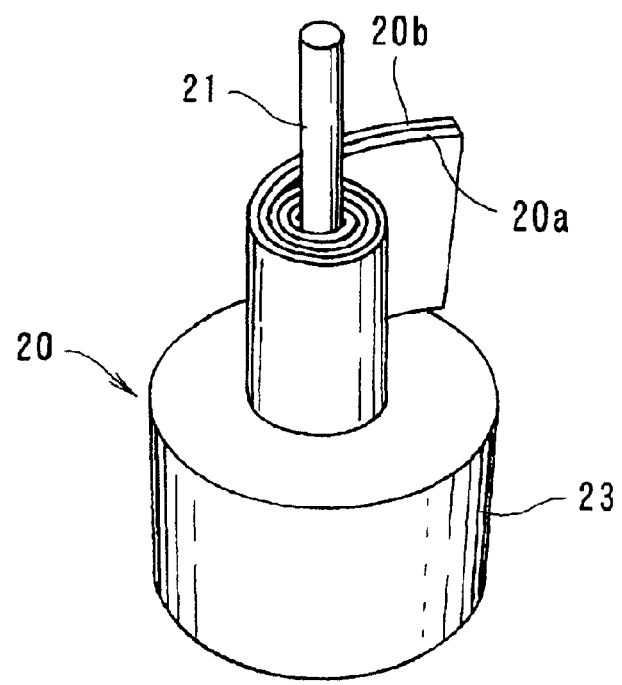
FIG. 6 illustrates the method of fabricating the rotary electrode using the layer structure of FIG. 5.
Figure 7:
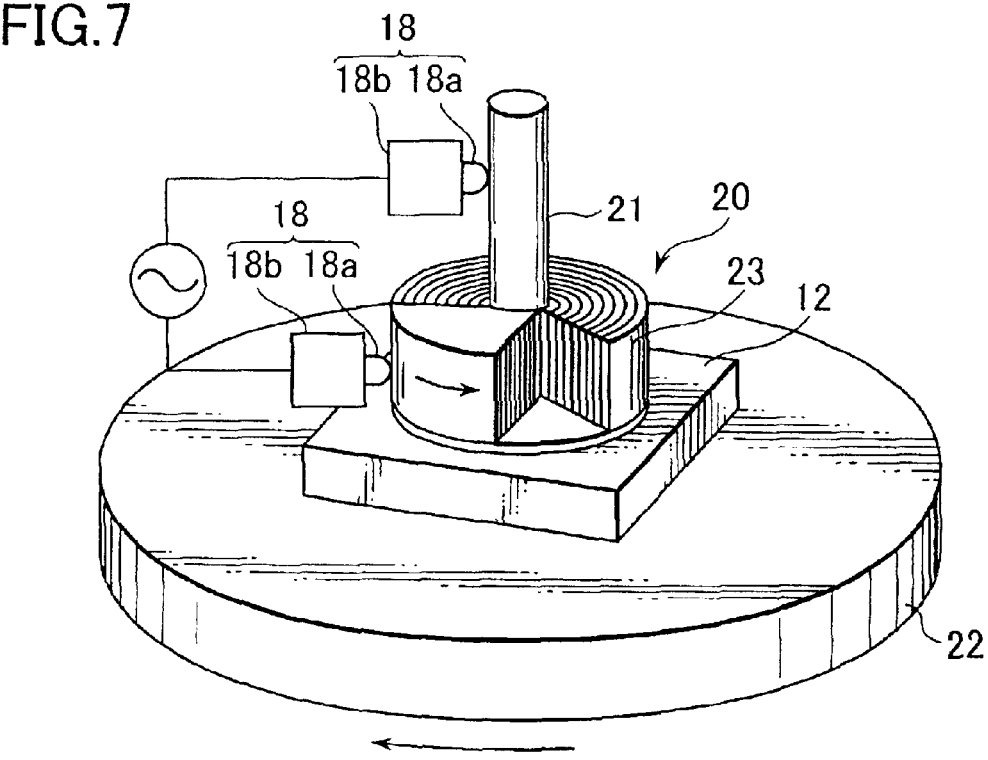
FIG. 7 shows a polishing apparatus that uses the rotary electrode of FIG. 6.

FIG. 5 shows a layer structure used to form the rotary electrode in a third embodiment of the invention, and FIG. 6 shows how the layer structure of FIG. 5 is used to manufacture the rotary electrode. A rotary electrode 20 is formed by forming a conductor 20a on an insulative member 20b to form an internal electrode element and winding the internal electrode of layered structure in a spiral arrangement around a spindle 21 and holding the wound layers in place by means of an electrode holder 23 that is an external cylindrical electrode element of conductive material. Vapor deposition, coating, adhesive or other such means can be used to apply a conductive substance to an insulative film to form a layered structure of the conductor 20a and the insulative member 20b. The polishing apparatus shown in FIG. 7 uses an electrode 20 thus fabricated.

The applied voltage can be kept down, ensuring safety, by using a rotary electrode comprised, as shown in FIG. 6, by layers of thin, film-shaped strips of the insulative member 20b and the conductor 20a shown in FIG. 5 wound in a spiral. The operation and effect of this embodiment thus configured will now be explained. To start with, the rotary electrode 20 can be readily fabricated by simply winding the electrode layers around the spindle 21. An alternating-current voltage having a rectangular or sinusoidal waveform is applied to the rotary electrode 20 having the spirally-wound, film-shaped conductor 20a. The rotary electrode 20 is rotated by a drive means that is not shown. A rotary surface plate 22 rotates the workpiece 12 in the opposite direction to the rotary electrode 20.

In the case of this embodiment, the thickness of the insulative member 20b can be reduced, which makes it possible to keep the applied voltage down to the required level. In the case of an insulative film that is 0.1 mm thick, for example, an applied voltage of 200 to 300 volts can be used. The ability to use a lower applied voltage makes a high-voltage apparatus unnecessary, and also facilitates attachment to the head of machine tools such as machining centers and general-purpose milling machines. Therefore, electrical power consumption can be reduced. Thus, there is no need for a special high-voltage power supply, which helps to simplify the system configuration and reduce the cost. The lining up of the abrasive particles parallel to the workpiece surface makes it possible to achieve a high-quality polished surface even with fluid compositions containing a low concentration of abrasive particles, which helps to reduce costs and makes it unnecessary to use a polishing pad.

Figure 8:
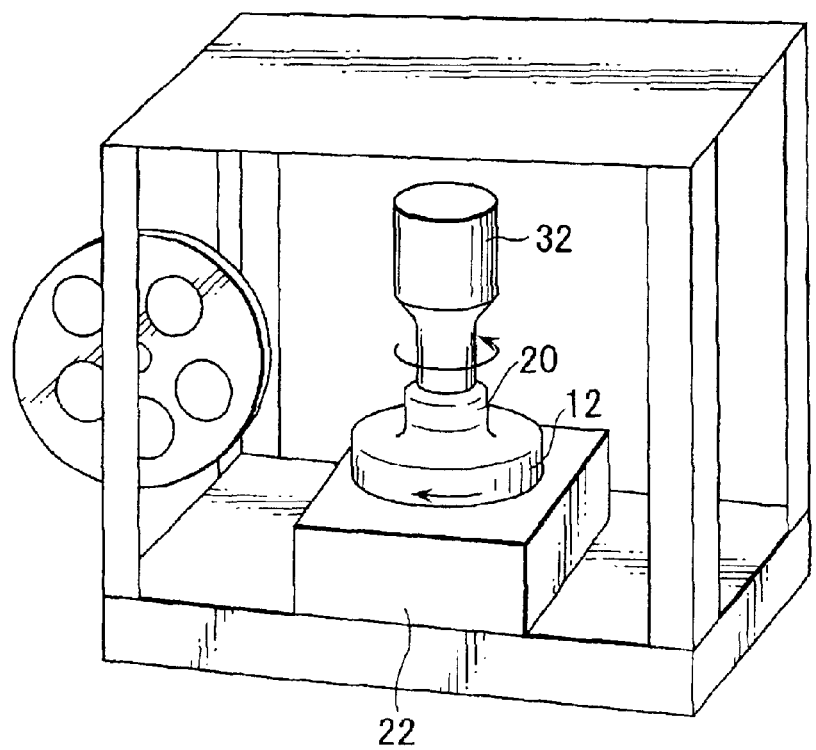
FIG. 8 shows an example of a machining head application of the rotary electrode of the invention.

FIG. 8 shows an example of the rotary electrode 20 of the invention used on a machining head. The electrode 20 is affixed to the head 32 of the machining center, enabling the workpiece 12 to be polished on the rotary surface plate 22.

Figure 9A:
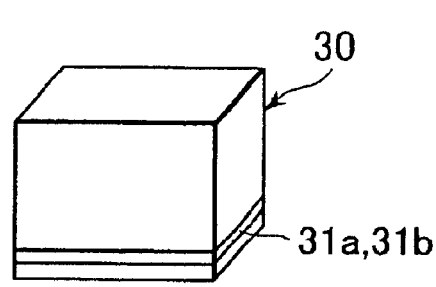
FIG. 9($a$) is a perspective view of a rotary electrode according to a fourth embodiment of the invention, and FIG. 9($b$) shows the electrode portion of the rotary electrode of FIG. 9($a$).
Figure 9B:
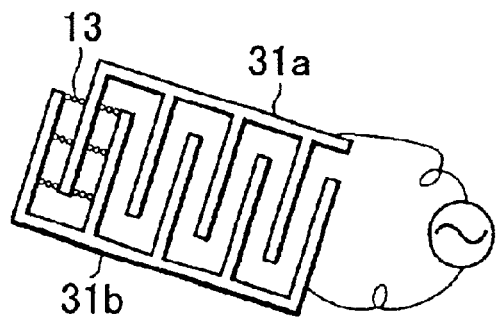

FIG. 9 shows an electrode according to a fourth embodiment of the invention, that is used to polish a three-dimensional workpiece making use of a Coulomb force attracting the abrasive particles to the electrodes, with FIG. 9(a) being a perspective view of the electrode and FIG. 9(b) showing the electrode portion. The electrode body 30 comprises a pliant,porous member and electrode elements shaped like the teeth of a comb. As shown in FIG. 9(b), the electrode elements 31a and 31b shaped like the teeth of a comb are mutually opposed, with the teethportions being mutually offset with a prescribed spacing therebetween. An alternating-current voltage is applied to the electrode elements 31a and 31b. Changes in the field polarity imparted by a low-frequency alternating-current electrical field are used to effect dressing by producing contact and collisions of the abrasive particles, and are also effective for removing polishing debris and preventing clumping of the abrasive particles. Sponge, foamed resin and so forth can be used to form the pliant, porous member. The apparatus thus configured was used to polish a workpiece having a surface processed to a roughness of 10 $\mu$m Ry by an electrical discharge machine. Polishing for 30 minutes at a processing force of 500 gf and an applied electrical field strength of ±2.0 kV/mm resulted in a mirror-surface roughness of 0.2 $\mu$m Ry.

Figure 10:
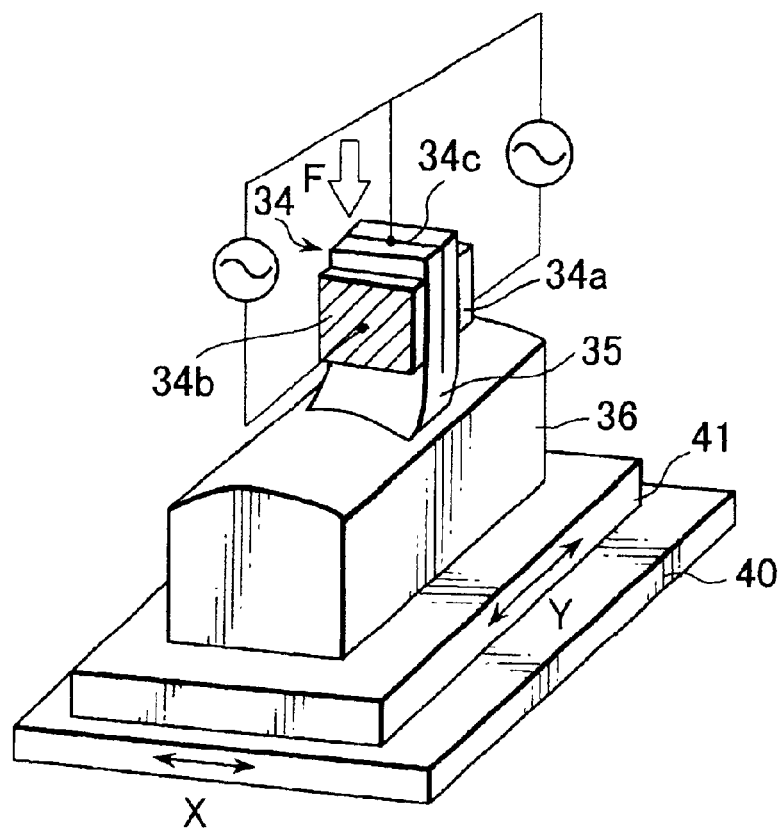
FIG. 10 is a perspective view of the principle parts of a fifth embodiment.

FIG. 10 is a perspective view of the principal parts of a fifth embodiment. Here, an electrode body 34 comprises a central electrode body formed of a porous member 35 that has an electrode member 34c inserted therein and is flanked at each end by electrode elements 34a and 34b. When an alternating-current electrical field is applied, the abrasive particles are disposed between a workpiece 36 and the electrode body 34. The workpiece 36 is processed by applying a processing force to the workpiece 36 via the electrode body 34 and effecting reciprocating movement of traveling surface plates 40 and 41 along the X and Y axes, respectively, producing a relative motion that rolls the abrasive particles. The plates 40 and 41 can also be moved horizontally at 0.1 to 30 Hz by means of a linear motor or the like. The electrode body 34 and the traveling surface plates move in sync at right-angles. For example, the plate 40 moves along the X axis in fine increments at 5 to 30 Hz and the plate 41 moves along the Y axis in fine increments at 0.1 to 15 Hz.

Using the above configuration, an electrical field is applied to the electrode elements 34a and 34b while applying a processing pressure. The Coulomb force that is thus generated causes the abrasive particles to accumulate on the processing surface of the porous member 35, which sweeps back and forth along the Y axis, flexing pliantly like a broom. This makes it easy to roll the abrasive particles, making it possible to keep the processing pressure low. This enables high-quality polishing without changing the properties of the processed layer. Because the porous member 35 can be pushed up at right-angles to the surface, it is also possible to apply a uniform processing pressure to curved surfaces. Also, the low processing pressure reduces roll-over on angled portions.

Figure 11:
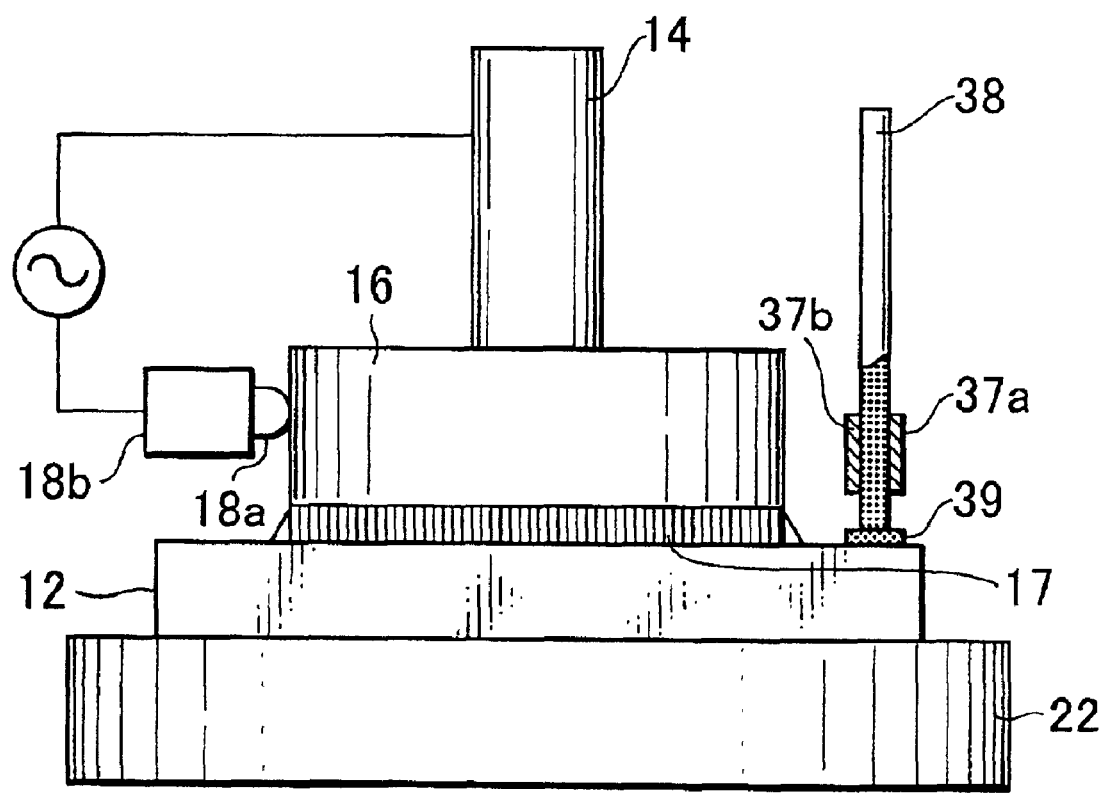
FIG. 11 illustrates an example of supplying an abrasive fluid in the polishing apparatus of the invention.
Figure 12:
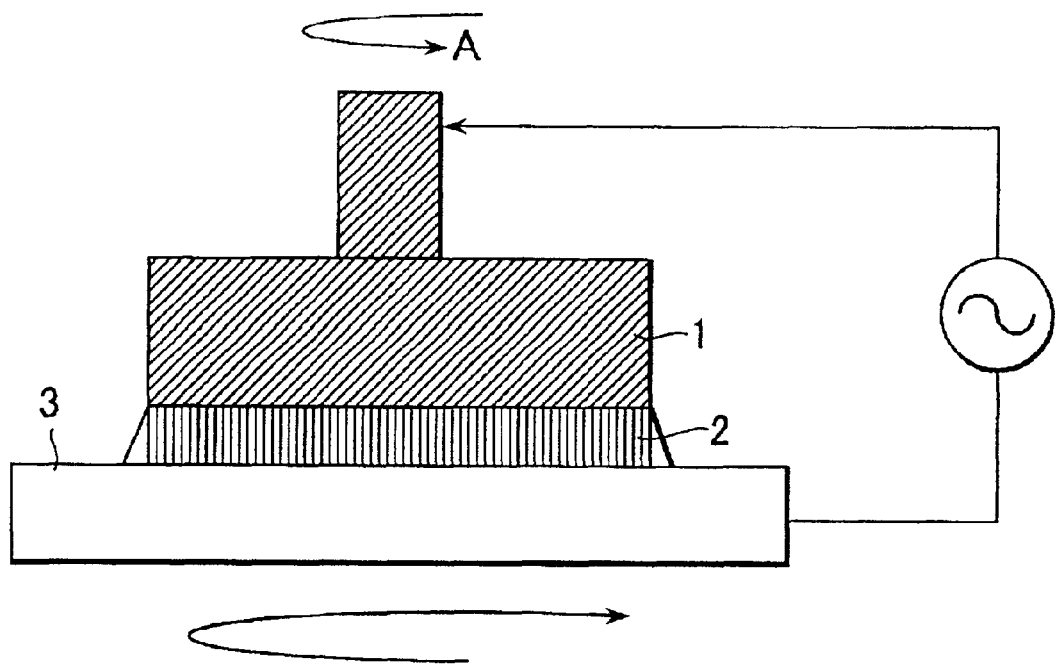
FIG. 12 shows a prior art polishing apparatus electrode.
Figure 13:
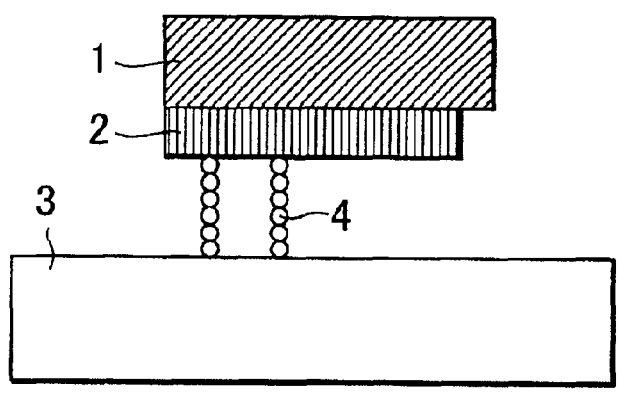
FIG. 13 illustrates the effect of the prior art polishing electrode of FIG. 12.

FIG. 11 illustrates an embodiment that uses the polishing apparatus of the invention to effectively form a good polished surface. Parts that are the same have been given the same reference numerals, and further description thereof is omitted. Via an insulative tube 38, a fluid 39 comprising a dispersion of abrasive particles in lubricating oil is supplied onto the top of the workpiece 12. Electrodes 37a and 37b provided midway along the tube 38 are used to apply an alternating-current electrical field. This increases the viscosity of the fluid flowing between the electrodes 37a and 37b, and therefore can be used to adjust the amount of the fluid 39 that is supplied to the workpiece 12. The application of the electrical field across the electrodes 37a and 37b also prevents the abrasive particles from clumping together, thus ensuring delivery of a stable dispersion fluid. As a result, a high-quality polished surface can be achieved.

As described in the foregoing, in the polishing apparatus using a rotary electrode according to the present invention, the electrode is divided into a plurality of elements, which makes it possible to effect polishing without regard to the shape, material or, in particular, the thickness of the workpiece. When the unitary type electrode of the prior art is used to polish an insulative workpiece, the workpiece thickness acted as an air-gap, necessitating the use of a high application voltage to accomplish the polishing. Such an operation carried with it runs a high risk of discharges and was unsafe. However, with the multi-element electrode configuration used by this invention, the abrasive particles contained in silicone oil, on the polishing pad are aligned parallel with the surface being polished and moved in accordance with the frequency of the applied voltage, making it possible to also polish insulative materials.

Thus, the workpiece can be uniformly polished regardless of the material. In particular, since a voltage is not applied to the workpiece, both conductive and insulative workpieces can be polished. For example, it is possible to polish insulative, brittle materials such as ceramics and glass. Thus, the polishing apparatus does not impose a restriction on the workpiece materials that can be polished. The multi-element electrode produces fine and coarse abrasive particle areas parallel to the surface being polished, in accordance with the disposition of the electrode. In addition to the dressing effect produced by the movement of the abrasive particles in response to the frequency of the applied voltage, polishing debris is discharged from the coarse areas. The uniform disposition of the abrasive particles is facilitated by controlling the voltages applied to the plurality of electrode elements, thereby enabling control of the surface roughness.

What is claimed is:

1. A polishing apparatus for polishing a workpiece by utilizing a fluid including abrasive particles having a dielectric property, comprising:

an electrode configured to apply processing pressure to the abrasive particles on the workpiece and having a plurality of electrode elements configured to collect and arrange the abrasive particles by a Coulomb force produced by application of an alternating-current voltage to the electrode; and a driving device for driving the electrode, wherein the electrode comprises a cylindrical electrode having a film-shaped conductor and an insulative layer that are wound around a spindle so that the conductor and insulative layer are alternated around the spindle.

2. A polishing apparatus according to claim 1, further comprising an insulative tube used to supply the fluid containing a dispersion of said abrasive particles to the workpiece and electrodes provided around the insulative tube to adjust fluid flow from the insulative tube.

3. A method of polishing a workpiece, comprising:

supplying a fluid including abrasive particles having a dielectric property to the workpiece;

providing an electrode configured to apply processing pressure to the abrasive particles on the workpiece and having a plurality of electrode elements configured to collect the abrasive particles; and applying an alternating-current voltage to the electrode to produce a Coulomb force, wherein said providing includes providing a cylindrical electrode having a film-shaped conductor and an insulative layer by winding the film-shaped conductor and the insulative layer around a spindle alternately.

4. A method according to claim 3, further comprising:

providing an insulative tube configured to supply the fluid containing a dispersion of the abrasive particles to the workpiece; and providing electrodes around the insulative tube to adjust fluid flow from the insulative tube.

* * * * *